June 9, 1964 G. R. RYAN 3,135,993
MOLDING AND ASSEMBLING APPARATUS AND METHOD
Filed Oct. 8, 1959 7 Sheets-Sheet 4
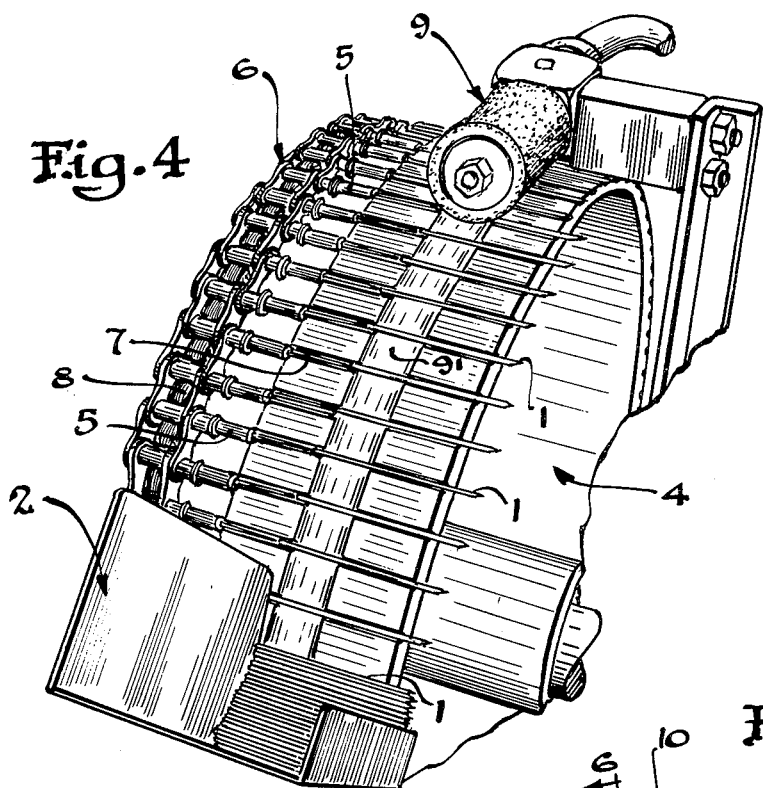
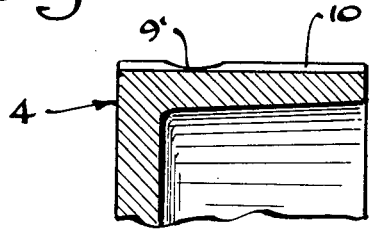
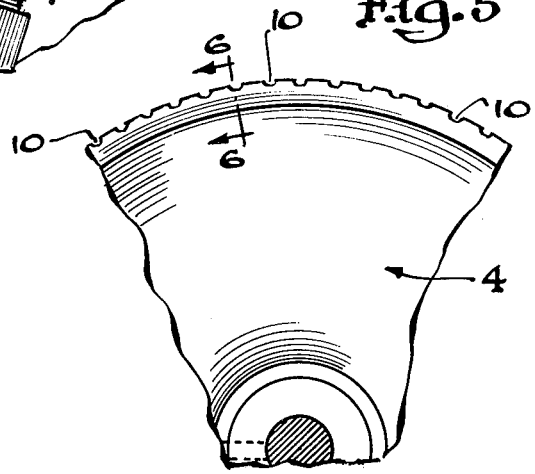
Inventor
George R. Ryan
By William E. Dominick
Attorney Inventor
George R. Ryan
By William E. Dominick
Attorney

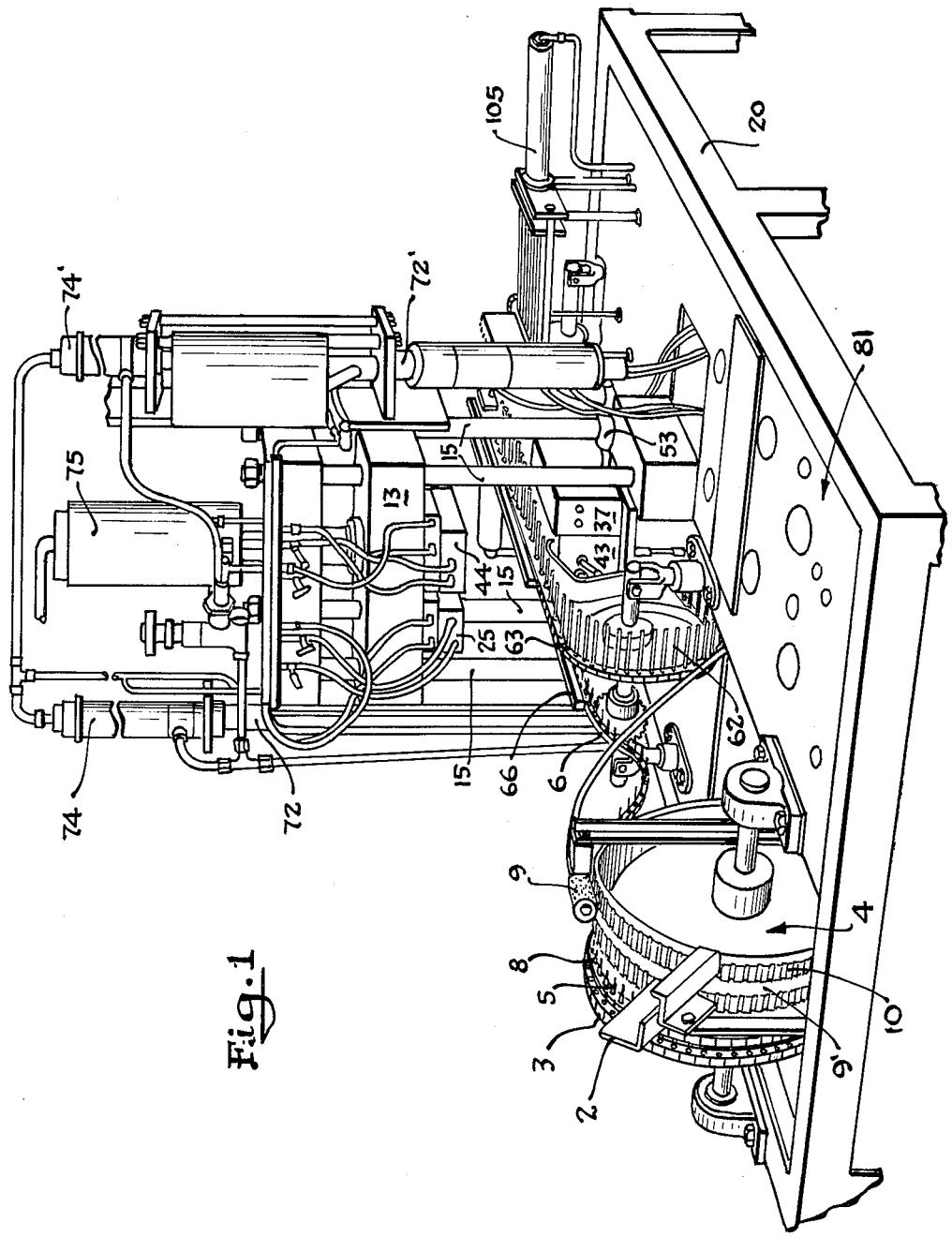

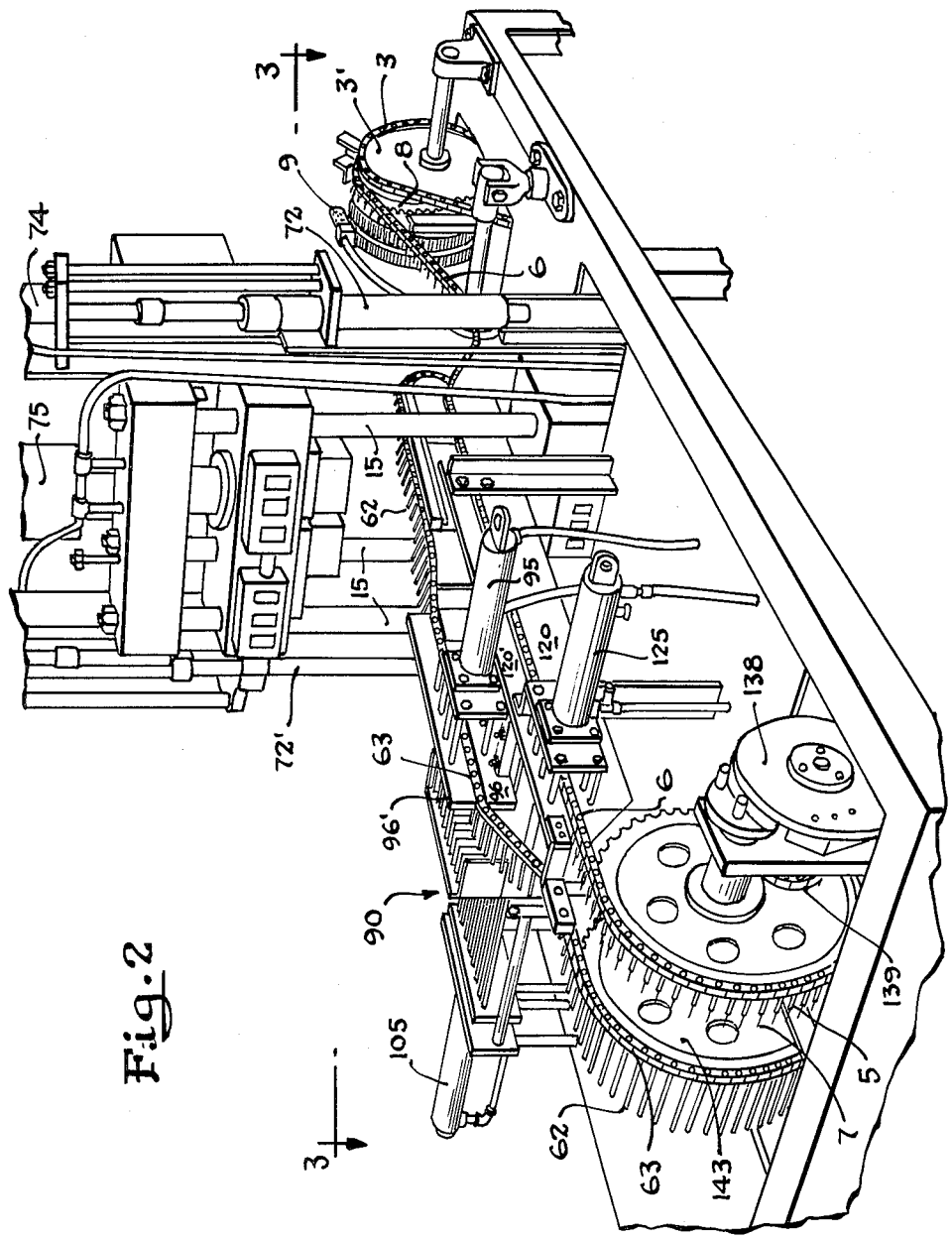

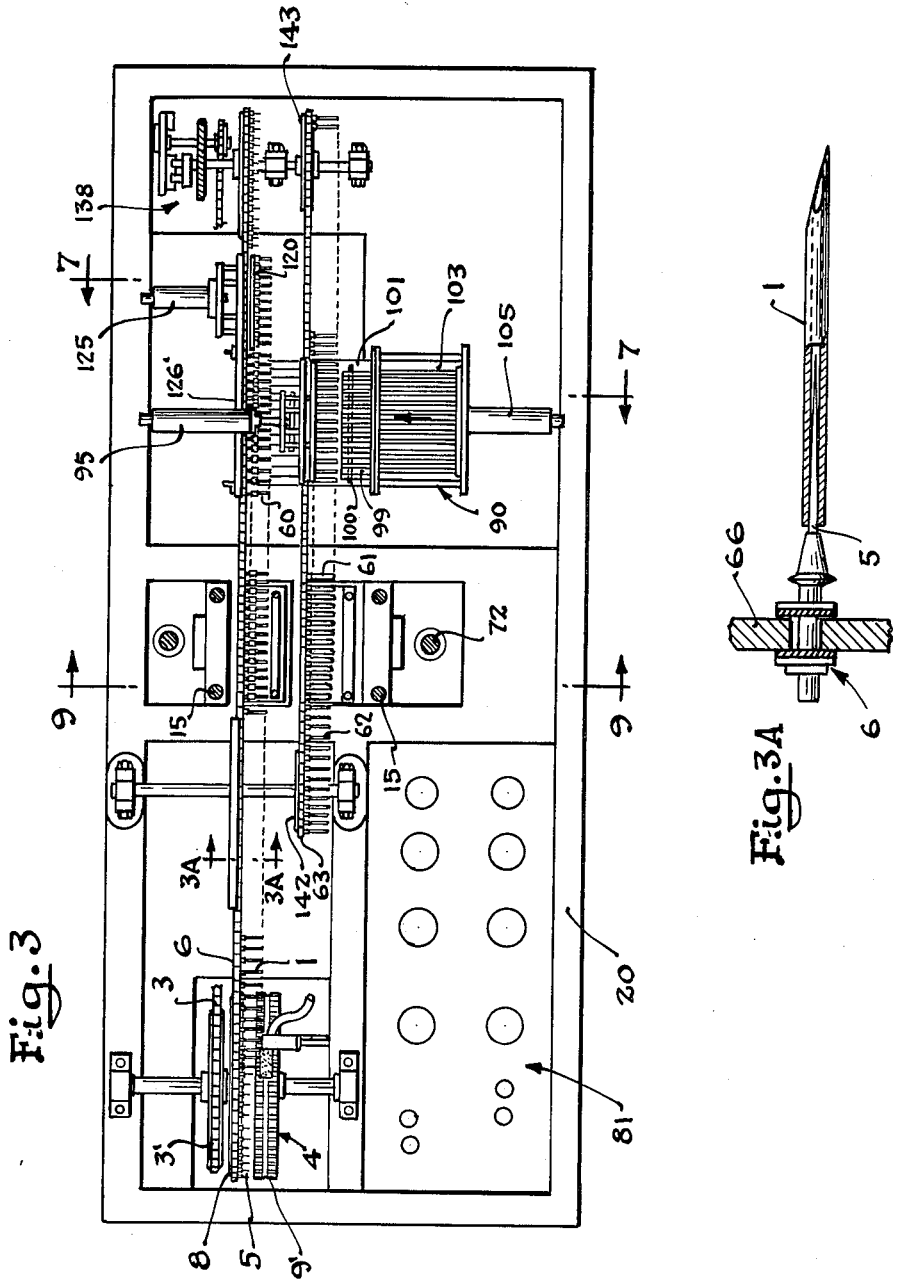

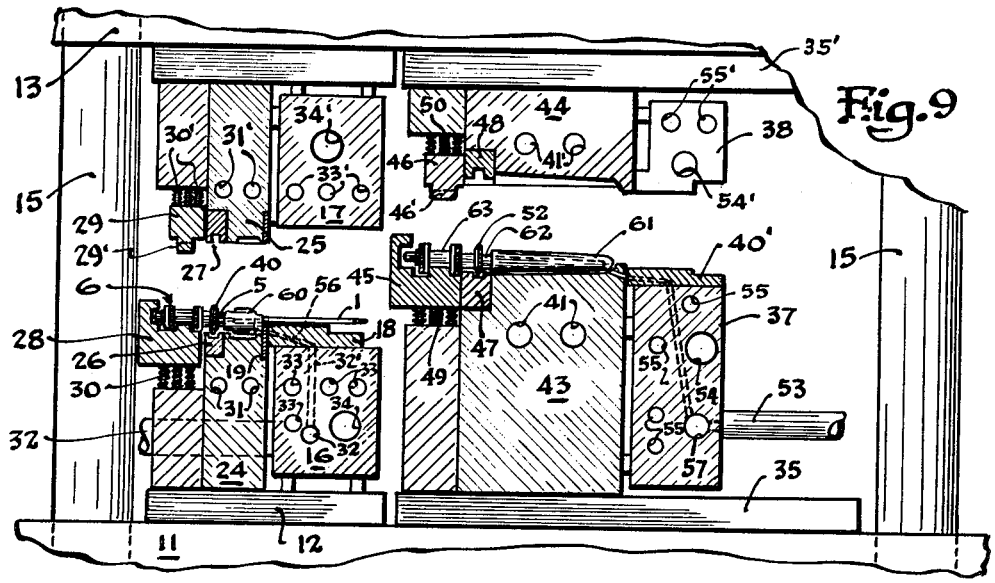
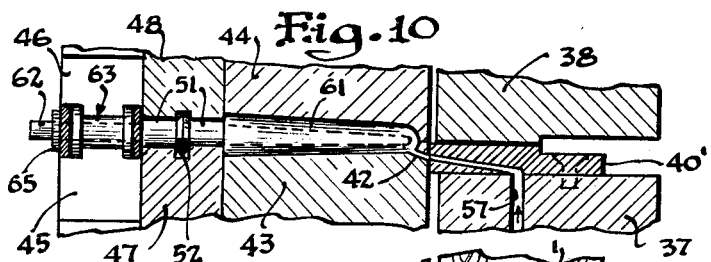
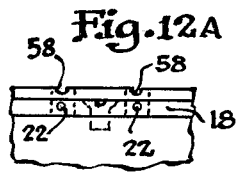
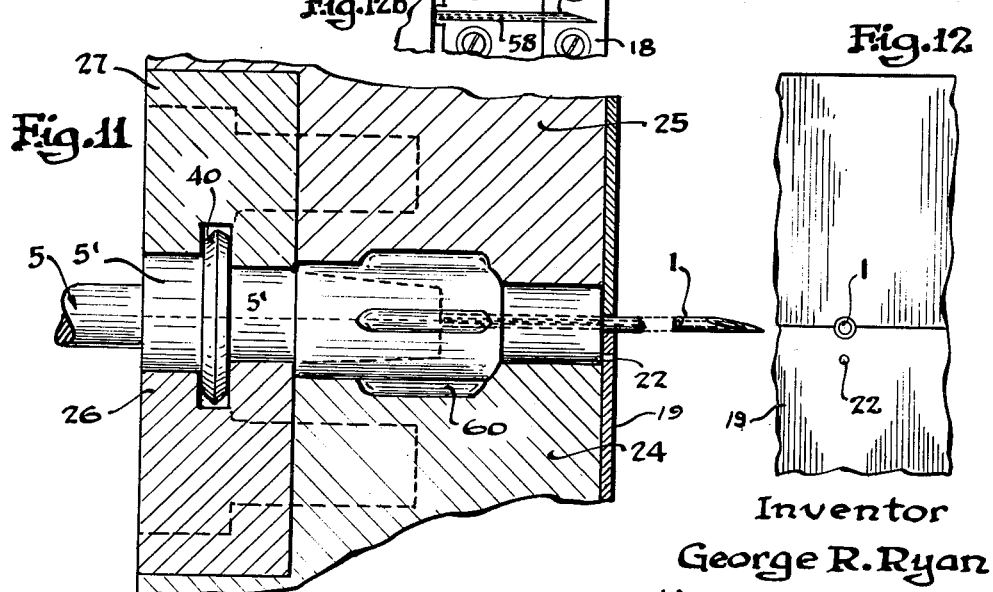
Inventor
George R. Ryan
By William E. Dominick
Attorney

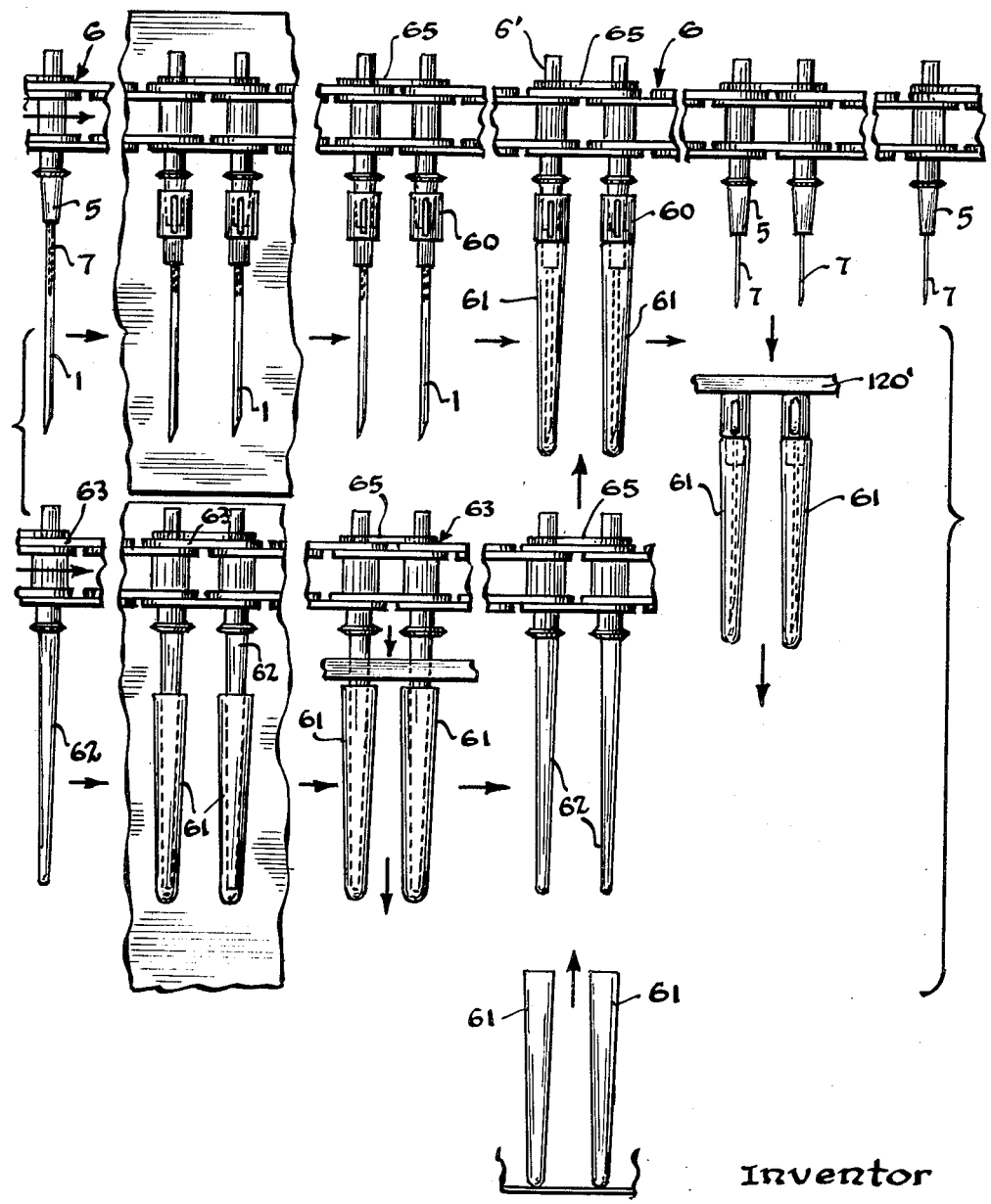

ent Office
3,135,993
Patented June 9, 1964

3,135,993
MOLDING AND ASSEMBLING APPARATUS
AND METHOD
George R. Ryan, Waukegan, Ill., assignor, by mesne assignments, to Brunswick Corporation, Chicago, Ill., a corporation of Delaware
Filed Oct. 8, 1959, Ser. No. 845,127
16 Claims. (Cl. 18—5)

The present invention relates generally to improved ways and means of molding and assembling plastic materials and parts. More particularly, the present invention relates to improved apparatus and methods for automatically molding a thermoplastic material about a mold core element, such as a hypodermic needle cannula, and to improved means for assembling a molded thermoplastic part with one or more other parts, such as mounting a hypodermic needle sheath on a molded hypodermic needle hub.

Hypodermic needles have for many years been manufactured with screw machine fabricated metal hubs. Many attempts have been made to replace these metal hubs with hubs made from more economical materials and by less expensive methods of manufacture. In one prior attempt to produce economically a molded plastic hub on a hypodermic needle cannula, the needle cannulae were loaded into mold cavities by hand or with the aid of a loading jig or fixture. Frequently in this operation, however, the points of the cannulae were damaged and considerable time and money were expended in inspecting and resharpening the needle points damaged during the several manipulative steps. Also, each of the molded hubs thus produced had to be placed in a suitable container or provided with a suitable protective sheath which further added to the overall cost of producing the needle. As all other known processes and apparatus for producing molded plastic hypodermic needle hubs are no more suitable for the large scale commercial production of plastic hypodermic needle hubs than the above described process, there has to date been no efficient and reliable method and apparatus for molding a plastic hub on a hypodermic needle cannula.

It is therefore an object of the present invention to provide new and improved apparatus for molding plastic material.

It is also an object of the present invention to provide a new and improved method of molding plastic materials.

It is a further object of the present invention to provide an improved method and apparatus for automatically and continuously molding plastic materials.

Another object of the present invention is to provide an improved apparatus and method of molding a plastic material about a preformed member.

Still another object of the present invention is to provide an improved apparatus and method of molding a plastic material about a preformed member which is mounted on a mold core element secured to a continuous conveyor.

A further object of the present invention is to provide an improved apparatus and method of molding a plastic material about a hypodermic needle cannula to provide a hub therefor.

Still another object of the present invention is to provide an improved method of molding a plastic material about a molded plastic part while the said part remains mounted on its mold core element or other element supported on said mold core element.

Another object of the present invention is to provide an improved apparatus and method of automatically molding a plastic composition hub on a hypodermic needle cannula and simultaneously molding a plastic composition sheath for the said cannula.

A further object of the present invention is to provide an improved apparatus and method of assembling a protective sheath on a hypodermic needle hub.

It is also an object of the present invention to provide an improved method and apparatus for assembling a preformed part with a molded structure while said structure is mounted on its mold core element.

A still further object of the present invention is to provide an improved method and apparatus for printing, marking, or otherwise operating upon a molded article while the said molded article remains mounted on a mold core element therefor.

Other objects of the present invention will be apparent to one skilled in the art from the detailed description and claims to follow in conjunction with the accompanying drawing wherein:

FIGURE 1 is a fragmentary perspective view of the molding and assembling apparatus of the present invention viewed from the front thereof;

FIGURE 2 is a perspective view of the molding and assembling apparatus of FIG. 1 viewed from the rear end thereof;

FIGURE 3 is a top plan view of the molding and assembling apparatus of FIG. 1 taken along the line 3—3 of FIG. 2;

FIGURE 3A is a fragmentary vertical sectional view taken along the line 3A—3A of FIGURE 3;

FIGURE 4 is an enlarged fragmentary perspective view of the cannula loading wheel shown in FIG. 1;

FIGURE 5 is a fragmentary side elevation view of the cannula loading wheel of FIG. 4;

FIGURE 6 is a vertical sectional view of the apparatus taken along the line 6—6 of FIG. 5;

FIGURE 9 is a fragmentary vertical sectional view along the line 9—9 of FIG. 3;

FIGURE 10 is an enlarged fragmentary vertical sectional view of the sheath mold means and associated elements of FIG. 9 with the mold means in closed position;

FIGURE 11 is an enlarged fragmentary vertical sectional view partially in side elevational view of the hub molding means of FIG. 9 with the mold in closed position;

FIGURE 12 is a fragmentary side elevational view of the hub molding means of FIG. 11;

FIGURE 12a is a fragmentary side elevational view of the hub molding manifold cap of FIG. 9;

FIGURE 12b is a fragmentary top plan view of the hub molding manifold cap of FIG. 9; and FIGURE 13 is a fragmentary plan view of the hub mold core chain and the sheath mold core chain schematically showing the assembling procedure.

Figure 7:
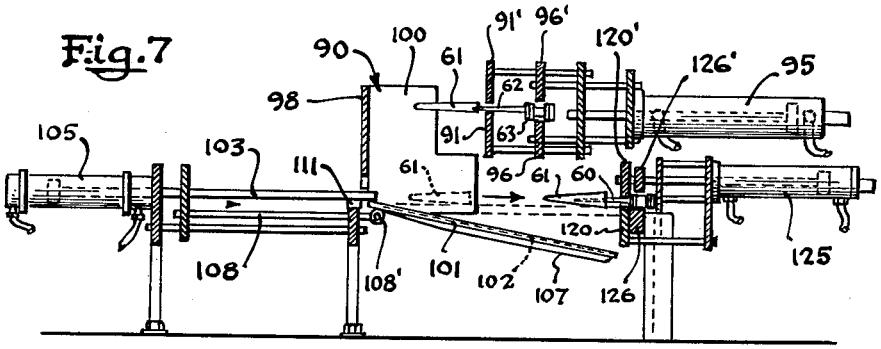
FIGURE 7 is a vertical sectional view of the apparatus taken along the line 7—7 of FIG. 3.

Referring to the accompanying drawing, there is shown an apparatus for molding a thermoplastic compound, such as methamethacrylate or polyethylene plastic, about a mold insert element comprising a hypodermic cannula 1 mounted on a hub mold core element 5 to form a hub 60 and simultaneously molding a hypodermic needle protective sheath 61 which is detachably mounted on the hub 60. In the hub molding apparatus of the present invention a plurality of the cannulae 1 are positioned in a hopper 2 with the pointed end of each cannula 1 extending outwardly and lying in a plane parallel to the plane of the hub core element 5 which preferably forms an integral extension of the pivotal link pin 6' of the link chain wherein the individual links are spaced by conventional sprocket engaging spacer collars, and locked in position by chain clip 65. The lower end of the hopper 2 is disposed adjacent the periphery of a rotatable cannula receiving and loading wheel 4 having a plurality of spaced transverse grooves 10 in the periphery thereof to receive therein a cannula 1 from the hopper 2 as the wheel 4 moves past the lower end of the hopper 2. The grooves 10 are spaced circumferentially on the wheel 4 a distance equal to the distance between the mold core elements 5 on the chain 6. The grooves 10 are adapted to receive therein the outer end of the mold core element 5 which is made in the form of a small diameter gradually tapered spike 7 having a pointed end and adapted to fit into the bore of the cannula 1. The grooves 10 lie in a plane parallel with the plane of the axis of the hub core element 5 and are positioned opposite a hub core element 5 during one portion of the rotation of the loading wheel 4.

As the loading wheel 4 is continuously rotated in a clockwise direction by means of the drive sprocket 3' which is rotatably driven by the drive chain 3, the cannulae 1 in the grooves 10 successively pass below the friction cannula loader 9 which engages the cannula 1 extending across the channel 9' in the loading wheel 4 to slide the cannula 1 onto the spike 7 of the mold core element 5. The cannula 1 thus is mounted on the hub core element 5 and is carried to the hub molding station by the intermittent movement of the endless chain 6.

Figure 9A:
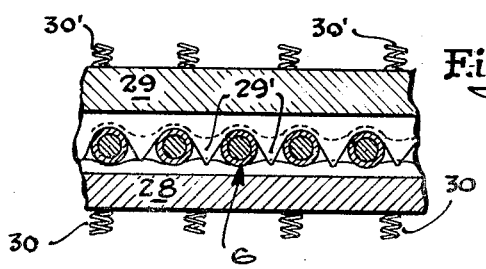
FIGURE 9A is a fragmentary vertical sectional view of the chain centering bars of FIGURE 9 in closed engagement with the link chain conveyor shown therein.

As the endless chain 6 advances the hub mold core element 5 with each supporting a cannula 1 to the hub molding station while the mold is in the open position, the chain 6 comes to rest on the lower chain centering bar 28 (see FIG. 9) which is resiliently supported by spring means 30 on the lower mold block secured to the mold base 12. The spring means 30 normally holds the mold core element 5 in a position slightly above the mold cavities so that the mold core elements 5 and the molded hubs 60 are clear of the surface of the mold sections and can be moved thereacross without contacting the mold surfaces. In order to insure the proper alignment of the chain 6 on the bar 28 it is desirable that the chain 6 be guided toward the molding means by an upper chain guide bar 66 centering the chain generally with the aid of the oppositely disposed lower chain guide bar 66'. The lower chain centering bar 28 positions the mold core elements 5 above the hub mold cavities of the lower hub mold section 24 in the hub mold assembly. As soon as the mold core elements 5 are positioned above the mold cavities of the lower hub mold section 24, the upper mold assembly is moved slowly downwardly under low hydraulic pressure. The upper chain centering bar 29 extending the length of the mold is resiliently mounted on the upper mold assembly by spring means 30' and has a plurality of sprocket-like teeth 29, extending downwardly and engageable with the link chain 6. The pressure applied by the downwardly moving centering bar 29 depresses the hub core element 5 into the mold cavities and more accurately centers the hub mold core elements 5 in the mold cavities. While the chain 6 which carries the mold core elements 5 is held between the centering bars 28, 29 and with the surfaces of the lower mold section 24 and the upper mold section 25 within a few thousandths of an inch of each other, the hydraulic mechanism applies high pressure to the movable upper mold section 25 in order to bring the fixed lower hub mold core centering section 26 and the fixed upper hub mold core centering section 27 on the lower and upper mold sections, respectively, into engagement with the shank portions 5' of the mold core elements 5 and the centering disc 40 of the mold core element 5, thereby forcing the said mold core elements 5 very accurately into molding position within the mold cavity and holding the mold sections in molding engagement during the entire injection molding operation. When thus arranged and positioned, the cannula 1 mounted on the mold core element 5 extends outwardly from the mold cavity with the outer end thereof disposed in the groove 58 in the lower hub mold manifold cap 18. The upper hub mold section 25 mounted on the movable upper platen 13 is actuated by a hydraulic piston 75 and is maintained in proper alignment at all times with the lower mold assembly by platen guide rods 15 which are fixedly disposed in the fixed platen 11 of the molding apparatus supported by the frame 20.

In the hub molding cycle the lower mold 24 and the upper mold 25 are maintained at their proper temperature for molding by means of heating or cooling fluids being circulated through fluid passages 31, 31', in the respective mold blocks. The heating elements 33, 33' in the lower hub mold manifold 16 and the upper hub mold manifold 17, respectively, maintain the proper temperature of the plastic in the manifolds, the said temperature in the manifolds being controlled by the thermostats 34, 34'.

The upper surface of the lower hub mold manifold 16 has mounted thereon a manifold cap 18 which has a small diameter passage 56 extending therethrough communicating with the plastic gate 22 in the end plate 19 attached to the lateral surface of the lower hub mold section 24. With the mold core elements 5 positioned within the mold with the sections in molding engagement, the hydraulic piston 74 activated by the timing cam means 134 forces the viscous plastic from the heated chamber 72 through the several passages 32, 32', and 56 and injects the plastic through gates 22 into the several hub mold cavities formed by mold sections 24, 25. The temperatures within the mold sections and manifolds and the pressures in the hydraulic system are indicated on the control panel 81.

After the plastic is injected into the mold cavities, the mold sections 24, 25 are kept in closed position for several seconds until the plastic has set into a rigid structure. The movable platen 13 is then elevated by hydraulic piston 75 which is activated by the timing cam means 134. The spring means 30 lifts the bar 28 and raises the chain 6 supporting the hub inserts 5 and the molded hubs 60 above the surface of the mold section 24. The Geneva gear drive means 138 then intermittently advances the chain 6 carrying the molded hubs 60 longitudinally a sufficient distance to remove the hubs 60 from the mold sections and to advance another set of hub mold core elements 5 mounted on the chain 6 between the mold sections 24, 25 and the molding process is repeated. Thereafter, the hubs 60 remaining mounted on the hub mold core elements 5 are advanced to the assembly station where a sheath 61 is mounted on each hub 60, after which the needle hub and sheath assembly is stripped from the hub mold core elements 5 and packaged, as will be described in detail hereafter.

The hypodermic cannulae covers or sheaths 61 are preferably molded simultaneously with and on a molding apparatus adjacent to the hub molding apparatus just described. Since there is no metal part or mold insert, such as a cannula, associated with the sheath 61, there is no need for using a loading hopper 2 or a loading wheel 4 in the sheath molding apparatus. Accordingly, an endless link chain 63 spaced laterally of the chain 6 and moving in a plane parallel to that in which the chain 6 travels, is supported at one end of the apparatus by an idling sprocket wheel 142 and at the other end of the sheath molding apparatus by a power driven sprocket wheel 143 operated intermittently by the Geneva gear drive means 138. The chain 63 has a plurality of sheath mold core elements 62, each preferably being an integral extension of the pivotal link pins of each of the links of the endless link chain conveyor 63. As the chain 63 intermittently advances the sheath mold core elements 62 to the sheath molding station, the chain 63 comes to rest on the lower chain centering bar 45 which is resiliently supported by spring means 49. The spring means 49 normally holds the sheath mold inserts 62 in a position slightly elevated above the surface of the mold cavities so that the core elements 62 and the molded sheath formed thereon are clear of the mold cavities and can be moved thereacross without contacting the lower mold section 43. The lower sheath mold section 43 is supported on the mold base plate 35 and preferably has the same number of cavities as the hub mold section 24.

The upper sheath mold section 44 is attached to the upper mold base plate 35′ which is mounted on the movable upper platen 13 is moved downwardly toward the lower mold section 43 under low hydraulic pressure from the hydraulic pressure piston 75. The upper chain centering bar 46 resiliently supported by spring means 50 has a section of sprocket-like teeth 46′ extending downwardly from the upper mold section 44 along the length thereof which engages the link chain 63 and generally centers the sheath mold core elements 62 in the sheath mold section 43. When the upper and lower mold sections 43, 44, respectively, are within a few thousandths of an inch of each other, the hydraulic mechanism applies high pressure to the movable upper mold section 44 to bring the lower mold core elements centering section 47 and the upper mold core element centering section 48, each fixedly mounted on the lower and upper mold sections 43, 44, respectively, into engagement with the shank portion 51 of the core elements 62 and the centering disc 52 formed thereon, thereby forcing the sheath core element 62 accurately into mold position within the cavities of the sheath mold formed by the lower and upper mold sections 43, 44, respectively, and holding the mold sections in molding engagement during the molding operation.

The lower sheath mold section and the upper sheath mold section 44 are maintained at their proper temperatures for molding by means of heating or cooling fluids circulating through fluid passages 41, 41′. The lower sheath mold manifold 37 and the upper sheath mold manifold 38, respectively, are heated by heating elements 55, 55′, respectively, which are controlled by thermostats 54, 54′. The plastic material is conveyed to the sheath mold cavities from a heated plastic reservoir 72′ by means of conduit 53 communicating with passage 57 in the lower sheath manifold 37 which connects with the plastic gate 42 in the lower sheath mold section 43 and through the sheath manifold cap 40′.

When the sheath mold core elements 62 are accurately positioned with the mold completely closed in molding engagement, the hydraulic piston 74′ forces plastic from the plastic reservoir 72′ into the several sheath mold cavities through gate 42. After the plastic is injected, the mold sections 43, 44 are held in molding engagement until the plastic has set. The upper sheath mold 44 is then elevated by the hydraulic piston 75. The spring means 49 then raises the chain 63 along with the sheath mold core elements 62 and the molded sheaths 61 formed thereon so that the sheaths 61 clear the lower sheath mold section 43. The Geneva gear drive means 138 then advances the chain 63 and the molded sheaths a sufficient distance to remove all the sheaths from the mold and to present another set of sheath mold core elements 62 to the molding station, whereupon the sheath molding cycle is repeated.

Following the hub and sheath molding operations, the molded hubs 60 and the molded sheaths 61, each mounted on their respective mold core elements, are advanced simultaneously toward the assembly station 90, as the Geneva drive means 138 advances simultaneously both endless chains 6 and 63, respectively. The sheath mold core chain 63 moving in a path parallel to the path of the hub mold chain 6 is engaged between the lower and upper chain guide bars 96, 96′, respectively, and holds the chain 63 so as to prevent both lateral and vertical movement thereof. While thus held, the lower and upper sheath stripping bars 91, 91′, respectively, engage the vertical end surfaces of the sheaths 61 and forces the molded sheaths 61 off the mold core elements 62, as the hydraulic piston 95 moves the stripper bars 91, 91′ away from chain 63. The sheaths 61 fall into a sheath receiving compartment 98 which is divided into a plurality of individual sheath compartments 99 by a plurality of dividers 100. The compartment 98 is provided with a floor member 101 pivotally mounted at its outer end 111 and having a plurality of longitudinally extending grooves 102 on the upper surface thereof into which the sheaths fall when they are ejected from the sheath mold core elements 62. The rear wall of each sheath compartment 99 has an opening therein for the passage of a sheath pusher rod 103 which rides in groove 102. The rod 103 is actuated by a hydraulic piston 105. On the lower side of the floor member 101 is mounted a cam surface 107. A cam rod 108 with a roller 108′ on the end thereof is mounted for reciprocable movement below the floor 101 for engagement with the cam surface 107 and is reciprocably moved by the piston 105. The cam rod 108 and the sheath pusher rod 103 move forwardly simultaneously as the piston 105 moves forwardly. As the cam rod 108 advances, the floor member 101 is moved upwardly until the grooves 102 are in axial alignment with the molded hubs mounted on the mold core elements 5. The pusher rod 103, when it is fully advanced, positions the sheath 61 which is lying in the groove 102 of the compartment 100 on the hub 60 which remains on the hub mold core element 5 where it is retained frictionally.

After the sheath 61 is assembled on the hub 60, piston 105 retracts and floor 101 drops downwardly after which the Geneva drive means 138 advances the hub chain 6 to the hub stripper station where the chain 6 is held against vertical and lateral movement between the lower and upper chain guide bars 126, 126′, respectively. While the hub 60 with the sheath 61 mounted thereon is thus held, a vertically movable marker-sealer means 129 is lowered into engagement with the hub-sheath assembly to seal and apply an identification mark thereto, and thereafter is moved out of engagement therewith.

Thereafter, the end surface of the hub is engaged by the lower and upper sheath and hub assembly stripper bars 120, 120′, respectively, and the assembly is forced from the hub mold core elements 5, as the hydraulic piston 125 moves the stripper bars 120, 120′ outwardly. The assembled sheaths and hubs then fall onto a conveyor means or into a container (not shown) and the chains 6 and 63 are advanced so that the next group of molded sheaths and hubs are assembled in the foregoing manner, as schematically shown in FIG. 13 of the drawing.

Figure 8:
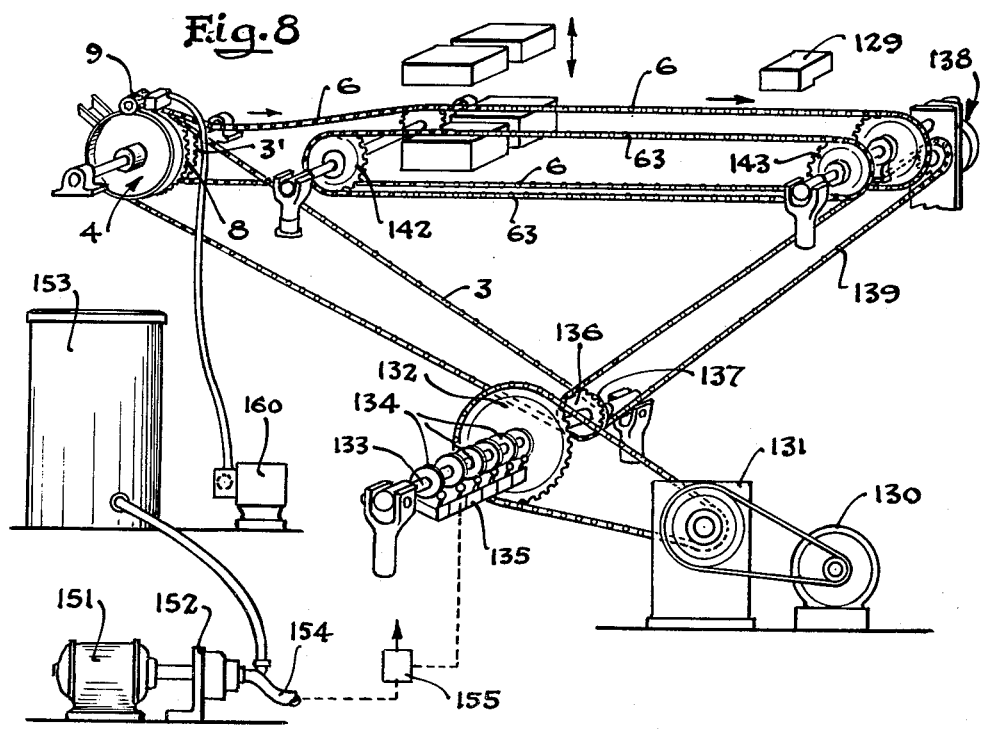
FIGURE 8 is a schematic view of the drive means for the conveyor means of the apparatus of FIG. 1.

The mechanism for driving the several moving parts of the molding apparatus described herein is shown schematically in FIG. 8 of the drawing. The hub mold core endless conveyor chain 6 and the sheath mold core endless conveyor chain 63 are driven by motor 130 through a variable speed gear box 131 connected with the drive sprocket 132 which is mounted on shaft 133. The drive sprockets 136 and 137 fixedly mounted on shaft 133 impart a continuous motion to the chain 139 driving the Geneva gear means 138 and to the chain 3′ driving the drive sprocket 3, respectively. The sprocket 3 rotates the loading wheel 4 and the sprocket 8 which drives chain 6. The gear box 131 and sprocket 132 also drive a plurality of timing cams 134 which actuate a plurality of micro switches 135 which are operatively connected with the several electrical solenoid valves 155 controlled by said switches. The hydraulic pressure required for operating the several hydraulic pistons is provided by a hydraulic pump 152 driven by a motor 151 which pumps oil from a reservoir 153 thru conduit 154 to the several solenoid valves 155 controlling the fluid flow to the several pistons described herein. The motor 160 through a flexible drive shaft connector drives the friction loader 9.

It will be apparent to those skilled in the art that whereas the specific embodiment illustrating the present invention relates to molding and assembling a plastic hypodermic needle hub and cannula with a sheath therefor, the present invention with obvious modifications can be adapted to molding and assembling many other articles. Thus, the present application is not limited to apparatus for molding hypodermic needle hubs and sheaths or assembly thereof, but rather encompasses broadly the concept of molding a plastic material or a thermoplastic metal about a core element or other mold insert connected to a mechanical conveying means having the element or insert integral therewith or securely mounted thereon and wherein the molded part is allowed to remain on the mold element or insert and is conveyed to a second station where a second part is joined thereto either by mounting a formed part thereon as in the instant application, or if desired, by using the first molded part still mounted on the core element or insert as a composite mold core element on which a second molding operation is performed to form a second part about the first part, as where an extension of the first molded part is desired or where an inlay or overlay of a different colored plastic is required. It will also be apparent to those skilled in the art that a wide variety of operations can be performed on the molded part or parts while held in a predetermined position or moved along a predetermined path, such as printing indicia thereon or sealing one part to another part after the assembly thereof.

Others may readily adapt the present invention for use under various conditions of service by employing one or more of the novel features disclosed or the equivalent thereof, without departing from the scope of the present invention as defined in the following claims.

I claim:

1. In an apparatus for molding including a molding station and means for presenting a plurality of mold core elements to said molding station, the improvement comprising; a link chain conveyor means having integrally associated therewith a plurality of mold core elements, means for moving said conveyor means to advance said mold core elements to and away from said molding station, and positioning means associated with said molding station having a plurality of sprocket teeth for engaging said link chain conveyor means to position said core elements relative to said molding station.

2. In an apparatus for molding including a molding station having a pair of oppositely disposed mold sections with each of said mold sections having a plurality of cavities and each of said sections being relatively movable to form a plurality of mold cavities and means for presenting a plurality of mold core elements to said mold sections, the improvement comprising; an endless link chain conveyor means having associated therewith a plurality of mold core elements, means for moving said conveyor means to advance said core elements to and away from said molding station, and positioning means associated with at least one of said mold sections for positioning said core elements, said positioning means having a sprocket-tooth bar section adapted to engage the said conveyor means to position the said core element relative to said mold section.

3. In an apparatus for molding including a molding station having oppositely disposed mold sections movable relatively to form a mold cavity and means for presenting a plurality of mold inserts to said molding station, the improvement comprising; an endless conveyor means having associated therewith a plurality of mold inserts, means for moving said conveyor means to advance said inserts to and away from said molding station, and movable positioning means associated with said molding station for positioning said inserts relative to said mold sections, said positioning means having a resiliently supported section normally maintaining said inserts out of contact with the said mold sections.

4. In automatic molding apparatus for molding thermoplastic parts including an injection molding station disposed intermediate the ends of said apparatus and having means for removing the molded parts from their respective mold core elements after leaving the said molding station, the improvement comprising; an endless conveyor means having associated therewith a plurality of mold core elements, means for moving said conveyor means to advance said core elements longitudinally of said apparatus to and away from said molding station, and guide means engageable with said conveyor means for securing said mold core elements against moving transversely when said molded parts are removed from said core elements after leaving said molding station.

5. In an apparatus for producing molded parts with a plurality of operating stations including an injection molding station having oppositely disposed mold sections movable relative to form a mold cavity therebetween and having means for presenting a mold core element between said mold sections, the improvement comprising; an endless conveyor means having a plurality of mold core elements integrally associated therewith, reciprocable means for positioning said core elements between said mold sections wherein an article is injection molded in the said mold cavity, and means for advancing said conveyor means with said article supported by said core element longitudinally from said mold cavity of the molding station, and means for mounting a second part on said article while said article is supported by the said mold core element.

6. In a molding apparatus, the improvement comprising; an endless conveyor means having a plurality of spaced mold core elements integral therewith, a second conveyor means having a plurality of second mold core elements integral therewith and being spaced from said first endless conveyor means, said first conveyor means and said second conveyor means carrying their respective mold core elements to and away from spaced molding stations wherein a first and second molded part are formed about the respective said first and second mold core element, means for removing said second molded part from said second mold core element at a mold core stripping station, and means for mounting the said second molded part on the first molded part while the said first molded part remains supported by the said first mold core element, and means for removing the said first molded part together with the said second molded part from the said first mold core element.

7. An apparatus for automatically molding hypodermic needle hubs comprising in combination, an endless conveyor means having extending therefrom at spaced points therealong a plurality of mold core elements having means for supporting a hypodermic needle cannula on each said mold core element, loading means disposed adjacent said conveyor means for mounting a said needle cannula on each said mold core element, drive means for said conveyor means to advance said mold core elements to and away from a molding station, said molding station comprising a lower mold section assembly mounted on a fixed platen over which the said conveyor means carries said mold core elements with said cannula thereon and an upper mold section assembly disposed above said lower mold assembly and mounted for movement toward and away from the said lower assembly, said upper assembly having extending downwardly from the surface thereof a resiliently mounted means for engaging said conveyor means for positioning said hypodermic needle cannula between the said mold assemblies, said mold assemblies forming a mold cavity about said hypodermic needle cannula, means for supplying a thermoplastic material to said mold cavity to form a molded hub on each said cannula while supported by said mold core element, and means for removing the said molded hubs from the said mold core elements after said elements have been carried by said conveyor means from said molding station.

8. The apparatus of claim 7 wherein the said mold core element sealably engages the interior of the said cannula and prevents thermoplastic material entering the said cannula.

9. A method of molding comprising, conveying to an injection molding station a plurality of mold core elements integrally associated with and disposed at spaced points along a conveyor means, positioning each of said mold core elements between mold sections forming a mold cavity at said molding station, injection molding simultaneously a plurality of articles about said mold core elements at said injection molding station, removing said mold core elements from the said molding station with the said articles being entirely supported by the said element and before the interior of said article is substantially completely solidified, moving said elements with the molded articles supported entirely by said elements to a mold core element stripping station, and removing said molded articles from said mold core elements at said stripping station.

10. A method of molding comprising, conveying to an injection molding station a plurality of mold core elements integrally associated with and disposed at spaced points along an endless conveyor means, injection molding an article about said mold core element at said molding station, removing said mold core element from said molding station with the said article remaining on the said element and before the interior of said article is substantially completely solidified, moving said element with the said molded article thereon to a second molding station, molding a second material over at least a portion of the surface of said molded article, and thereafter removing said molded article from said mold core element at a mold core element stripping station.

11. A method of injection molding comprising; conveying to an injecting molding station a plurality of mold inserts removably supported by mold insert-supporting elements integrally associated with an endless conveyor means, injection molding an article about each of said mold inserts positioned within an injection mold while said inserts are in engagement with said elements at said injection molding station, removing said mold elements and said articles from said molding station with the said inserts and articles being supported by said elements prior to complete solidification of said articles and allowing cooling and solidification thereon prior to removal from said elements, moving said elements with the molded articles thereon to a stripping station, and removing said articles from said elements at said stripping station.

12. In an apparatus for molding including an injection mold and means for presenting a mold insert to a cavity of said mold, the improvement comprising; an endless conveyor means having integrally associated therewith a plurality of mold insert-supporting elements with each said element adapted to removably support a mold insert for said cavity, means for moving said conveyor means to advance said insert-supporting elements and mold inserts to and away from said mold, and positioning means associated with said mold which engages said conveyor means and said mold insert-supporting elements adapted to position said mold inserts in said mold cavity prior to injection molding a part about at least a portion of each of said inserts.

13. The molding apparatus of claim 12, wherein each of the said mold core elements is comprised of a base section forming an integral part of said conveyor means and has an outwardly extending section adapted to support one of said mold inserts with said outwardly extending section having a positioning section formed thereon adjacent said base section which is adapted to be engaged by said mold to accurately position said inserts in said mold cavity.

14. In an apparatus for molding including an injection molding station having oppositely disposed mold sections movable relatively to form a mold cavity, and means for positioning a mold insert relative to said mold cavity, the improvement comprising; an endless conveyor means having mold insert-supporting elements integrally formed with said conveyor means at spaced points along the length thereof, means for moving said conveyor means to and away from said molding station, and reciprocal positioning means associated with said mold sections which are engageable with said mold insert-supporting elements and adapted to position said mold inserts relative to said cavity prior to injection molding about said inserts.

15. In an apparatus for molding including an injection molding station having oppositely disposed sections movable relatively for forming a mold cavity, and means for presenting a mold core element between said mold sections, the improvement comprising; an endless conveyor means having mold core elements integrally associated therewith at spaced points along the length thereof, means for moving said conveyor means to and away from said injection molding station and thereafter again moving said core elements to said molding station, and positioning means associated with said molding station and engageable with said conveyor means and said mold core elements to position said mold core elements in said mold cavity formed between said mold sections at said molding station prior to injection molding about at least a portion of said mold core elements.

16. The molding apparatus of claim 15, wherein each of said mold core elements is comprised of a base section forming an integral part of said conveyor means and an outwardly extending section having a positioning section formed thereon adjacent said base section which is adapted to be engaged by said mold to position said element in said mold cavity.

References Cited in the file of this patent
UNITED STATES PATENTS

| | | |
|---|---|---|
| 1,802,978 | McDonald | Apr. 28, 1931 |
| 2,128,827 | Killian | Aug. 30, 1938 |
| 2,226,408 | Nast | Dec. 24, 1940 |
| 2,233,543 | Maywald | Mar. 4, 1941 |
| 2,266,432 | Morin | Dec. 16, 1941 |
| 2,290,129 | Moreland | July 14, 1942 |
| 2,342,237 | Barbieri | Feb. 22, 1944 |
| 2,353,256 | Maywald | July 11, 1944 |
| 2,544,140 | Dofsen et al. | Mar. 6, 1951 |
| 2,556,237 | Teichmann | June 12, 1951 |
| 2,636,215 | Smith | Apr. 28, 1953 |
| 2,698,478 | Heisterkamp | Jan. 4, 1955 |
| 2,724,867 | Smith | Nov. 29, 1955 |
| 2,769,203 | Wood | Nov. 6, 1956 |
| 2,824,639 | Rosendahl | Feb. 25, 1958 |
| 2,829,756 | Gercke | Apr. 8, 1958 |
| 2,853,735 | Cooke et al. | Sept. 30, 1958 |
| 2,884,118 | Williams | Apr. 28, 1959 |
| 2,890,490 | Morin | June 16, 1959 |
| 2,916,765 | Heller | Dec. 15, 1959 |